United States Patent [19]

Usmani

[11] 3,776,724
[45] Dec. 4, 1973

[54] ELECTROPHOTOGRAPHIC COMPOSITION OF ZINC OXIDE AND A RESIN BINDER

[75] Inventor: Athar M. Usmani, Park Forest, Ill.
[73] Assignee: The Sherwin-Williams Company, Cleveland, Ohio
[22] Filed: Sept. 22, 1971
[21] Appl. No.: 182,854

Related U.S. Application Data
[63] Continuation-in-part of Ser. No. 84,102, Oct. 26, 1970, abandoned.

[52] U.S. Cl. .................................. 96/1.8, 96/1.5
[51] Int. Cl. ............................................ G03g 5/00
[58] Field of Search ............................. 96/1.8, 1.5

[56] References Cited
UNITED STATES PATENTS

| | | | |
|---|---|---|---|
| 3,681,069 | 8/1972 | McNamee et al. | 96/1.8 X |
| 3,649,263 | 3/1972 | Tubuko et al. | 96/1.8 X |
| 3,048,501 | 8/1962 | Miller et al. | 117/155 |
| 3,481,735 | 12/1969 | Graver | 96/1.5 |
| 3,245,786 | 4/1966 | Cassien et al. | 96/1 |
| 2,653,140 | 9/1953 | Wentworth et al. | 260/80.73 |
| 2,893,977 | 7/1959 | Suen et al. | 260/80.73 |
| 3,404,979 | 10/1968 | Boujour | 96/1.8 |

Primary Examiner—Norman G. Torchin
Assistant Examiner—John L. Goodrow
Attorney—Richard G. Smith et al.

[57] ABSTRACT

The electrophotographic resin compositions disclosed herein comprise 10–96 mole percent of an acrylate ester having the formula $CH_2=C(R)COOR'$, wherein R is H, $CH_3$ or $C_2H_5$ and R' is an alkyl radical of the formula $C_nH_{2n+1}$ with $n$ equal to 1–20, preferably 1–8; 0–86 mole percent of a vinyl monomer having the formula $CH_2=C(R''')R''''$ wherein R''' is H or $CH_3$ and R'''' is an aryl radical of 6–12 carbon atoms, -CN or -OOCR''''' wherein R''''' is alkyl, cycloalkyl or aryl radical of 1–12 carbon atoms; 1–5 mole percent of an acrylic acid and 1–8 mole percent of an acrylamide or polymerizable amine compound. This electrophotographic resin composition is particularly suitable for use as a binder in preparing zinc oxide coatings for paper used in reproducing images with superior speed by an electrophotographic method.

26 Claims, 4 Drawing Figures

PATENTED DEC 4 1973

INVENTOR.
ATHAR M. USMANI

BY: Walter J. Monacelli
ATTORNEY

ELECTROPHOTOGRAPHIC COMPOSITION OF ZINC OXIDE AND A RESIN BINDER

This application is a continuation-in-part of copending application Ser. No. 84,102, filed Oct. 26, 1970, now abandoned.

BACKGROUND OF THE INVENTION

1. Field of the Invention

This invention relates to new electrophotographic resins suitable for use as binders in preparing zinc oxide electrophotographic coatings. More specifically, it relates to such coatings applied to paper for the reproduction of images by electrostatic deposition.

2. Related Prior Art

In the electrophotographic recording and printing methods, it is necessary to have a surface which will accept and retain an electrostatic charge for at least several minutes in the dark. Immediate exposure of the charged surface to actinic radiation causes dissipation of the charge from these areas.

In carrying out an electrophotographic recording for reproducing an image, the entire photoconductive surface is given an electrostatic charge while protected against light. This is effected by friction, or, more commonly, by exposure to an electrical corona discharge. A pattern of actinic radiation is then applied to the charged surface, for example by exposure to actinic-radiation through a transparency or by reflection from an image-bearing surface. This discharges the exposed areas, but leaves the unexposed areas still charged in the form of the image. Then the exposed surface is brought into contact with a powder which is attracted to the charged areas of the surface, preferably a powder which has a charge opposite to that of the charged areas of the latent image on the surface, but is not attracted to and is easily removed from the discharged areas of the surface.

In this way an image is formed on the charged areas which may be transferred to another surface or may be heated and fused in situ on the areas of the original latent image. The surface to be used for such purposes must be very highly dielectric, non-conductive in the dark and will therefore hold an electrostatic charge for at least several minutes. The surface must be unaffected to any substantial extent by variations in moisture content of the surrounding atmosphere and must be free of conductive materials.

STATEMENT OF THE INVENTION

In accordance with the present invention, it has been found that the photoconductive properties of the zinc oxide-binder coating may be enhanced or a synergistic effect can be produced by using as the binder a resin containing both acid groups and amide or amine groups. The presence of the amide or amine also aids in the adhesion of the oxide-binder composition to the base material and aids in controlling the viscosity of the product. Particularly effective for this invention is a resin composition comprising:

a. 10–96, preferably 50–70 mole percent of an acrylate ester having the formula $CH_2=C(R)COOR'$, wherein R is H, $CH_3$ or $C_2H_5$ and R' is an alkyl radical of the formula $C_nH_{2n+1}$ with $n$ equal to 1–20, preferably 1–8;

b. 0–86, preferably 30–45 mole percent of a vinyl monomer having the formula $CH_2=C(R''')R''''$, wherein R''' is H or $CH_3$ and R'''' is an aryl radical of 6–12 carbon atoms, -CN or -OOCR''''' wherein R''''' is an alkyl, cycloalkyl or aryl radical of 1–12 carbon atoms;

c. 1–5, preferably 1.5–3 mole percent of a carboxylic acid-continaing monomer of an acrylic acid or anhydride, preferably selected from the class of acrylic acid, methacrylic acid, ethacrylic acid, maleic acid, fumaric acid, itaconic acid, R'''' half esters of itaconic, maleic and fumaric acids, crotonic acid, vinyl acetic acid, vinyl benzoic acid, alpha-chloroacrylic acid, alpha-phenylacrylic acid, and the like; and d. 1–10, preferably 1.4–8 mole percent of a basic monomer of an amide-containing monomer or 1–10, preferably 1–8 percent of an amine-containing monomer.

Typical amide-containing monomers that are suitable include acrylamide, methacrylamide, ethacrylamide, alpha-chloroacrylamide, alpha-phenylacrylamide, di-acetone acrylamide, etc.

The amine-containing monomer advantageously has an ionization constant in the range of $10^{-4}$ to $10^{-9}$ and may have a primary, secondary or tertiary amine group with the substituent groups preferably being alkyl groups of one–four carbon atoms. When the amine-containing monomer is a vinyl pyridine, the preferrred proportion is 1–3 mole percent, whereas with the other amines the preferred proportion is 2–6 mole percent.

Typical amine-containing monomers that are suitable include: t-butylaminoethyl methacrylate; diethylaminoethylmethacrylate; dimethylaminoethyl acrylate; dimethylaminoethyl methacrylate; 4-vinyl pyridine; ethylaminoethyl acrylate; diethylamino-trimethylene methacrylate; 3-vinyl pyridine; 2-vinyl pyridine; 2-methyl-5-vinyl pyridine; N-vinyl pyrrolidone; 5-ethyl-2-vinyl pyridine; 2-methyl-4-vinyl pyridine; 2-methyl-5-vinyl pyridine; paradimethylamino styrene; 2-aminopropyl vinyl ether; 2-aminoethyl vinyl ether; 6-aminohexyl acrylate; 6-aminohexyl acrylamide.

To produce a more flexible binder resin composition, the acrylate or methacrylate ester is preferably a mixture of two or more acrylates or methacrylates, such as methyl acrylate, methyl methacrylate, ethyl acrylate, ethyl methacrylate, butyl methacrylate, amyl acrylate, 2-ethylhexyl acrylate, octyl methacrylate, propyl methacrylate, benzyl methacrylate, methyl ethacrylate, ethyl ethacrylate, butyl ethacrylate, octyl ethacrylate, heptyl acrylate, lauryl acrylate, stearyl methacrylate, decyl acrylate, tridecyl methacrylate, and the like.

Typical vinyl monomers suitable for the practice of this invention include styrene, vinyl toluene, vinyl xylene, ar-ethylstyrene vinyl naphthalene, vinyl methyl-naphthalene, vinyl diphenyl, alpha-methylstyrene, isopropenyl toluene, isopropenyl naphthalene, isopropenyl diphenyl, acrylonitrile, methacrylonitrile, vinyl acetate, vinyl propionate, isopropenyl acetate, isopropenyl propionate, vinyl benzoate, vinyl octoate, and the like.

The carboxylic acid-containing monomer can be in the acid form or in its anhydride form during polymerization, but the anhydride, if used, is eventually hydrolyzed. Moreover, maleic anhydride or fumaric acid can be used in the copolymerization and eventually the resultant repeating unit esterified so as to give one acid group and one ester group in each repeating unit, or it can be amidified so as to give half acid and half amide. Or the half acid/half ester or half acid/half amide can be used as such in the original copolymerization. In such cases the molar proportions are calculated on the basis that half of the maleic or fumaric molecule is a mole of acid or a mole of amide, etc.

It is also contemplated that various functional groups can be added by post-reaction of a preformed polymer. For example in addition to the reaction cited above with maleic anhydride, it is also contemplated that a polymer containing an ethylol group such as hydroxy ethylated polyethyleneamine can be reacted with succinic anhydride to give repeating units having pendent groups containing free carboxylic acid groups.

The resin is prepared by the copolymerization of the aforenamed comonomers, preferably in a solvent such as toluene with the addition polymerization catalyzed by an initiator such as a free-radical generating catalyst. The methods and conditions for conducting the polymerizations are well known in the art and do not comprise any part of the present invention.

While various peroxides may be used for this purpose, the azo-type catalysts are preferred, such as azo-bisisobutyronitrile, 2,2'-azo-bis-2-ethyl-butyronitrile, and the like. Typical peroxy compounds that are suitable as polymerization catalysts include benzoyl peroxide, t-butyl peroxide, t-butyl perbenzoate, acetyl peroxide, lauryl peroxide, stearyl peroxide, phthallyl diperoxide, dicumyl peroxide, and the like.

The electrophotographic resin advantageously has a glass transition temperature ($T_g$) in the range of 15°–30° C., preferably about 25° C. Its molecular weight should be in the range of 5,000–200,000, preferably 10,000–100,000. Narrow molecular weight distribution is preferred.

The zinc oxide-resin composition is prepared by applying a solution of the resin, preferably in an aromatic solvent or a combination of aromatic solvent and an alkanol such as 1-propanol, with a non-volatile content of 20–60%, preferably 40–50%, and generally a viscosity of 5–65 Stokes, to the zinc oxide and evaporating the solvent. The zinc oxide-resin binder components are advantageously used in the ratio of 1–20, preferably 5–10 parts by weight of pigment per part of resin binder.

The zinc oxide suitable for the practice of this invention is the same type of finely divided zinc oxide presently used for electrophotographic purposes. Such materials are available commercially or may be prepared by sensitizing finely divided zinc oxide with various sensitizing dyes such as Eriochrome Black T, Bromophenol-B, Fluoresceine, a combination of Bromophenol-B and Fluoresceine, a combination of Bromophenol-B, Fluoresceine and Brilliant Yellow 6G, a combination of Bromophenol-B and Alphazurine-2G, and the like. These sensitizing dyes are also available commercially. Other appropriate dyes for this purpose are disclosed in U.S. Pat. No. 3,052,540.

A coating thickness of 8–20, preferably 11–13 micrometers is generally suitable for most purposes. The base may be paper, plastic, glass, wood, metal or other suitable material. Generally the amount of coating material ranges from 8 lbs. to 15 lbs. per 3000 sq. ft. of coated area.

In addition to toluene, various other solvents can be used such as benzene, xylene, kerosene, or other highly aromatic commercial solvents. Aliphatic hydrocarbons can be present in the solvent but not in high enough proportion to interfere with the solvent power of the aromatic hydrocarbon. Sometimes an alkanol such as 1-propanol is used to aid in achieving solubility of the acrylamide. Where longer chain acrylates or methacrylates are used, such as lauryl, stearyl, etc., aliphatic hydrocarbons in the solvent are more easily tolerated.

While applicant does not wish to be committed to any particular explanation or theory for the improved characteristics of the resin binder, it appears that the presence of both acid and amide or amine groups in the binder resin results in some kind of association which dramatically influences the electrical, photoconductive and printing properties of the resulting compositions. Advantageously, although a single acrylate or methacrylate may be used, a combination of a number of acrylates or methacrylates such as methyl methacrylate, butyl acrylate, butyl methacrylate, and others are preferred to balance each other in obtaining a more flexible resin.

The pigmentation or mixing of the oxide with the resin can be effected with various types of dispersion equipment such as ball mills, pebble mills, triple roll mills, sand mills, Cowles Dispersater, or any high impeller type equipment. Since the mixing is effected with quick wetting and formation of adsorbed layers, grinding aids are not required. Various dyes known in the art for that purpose are added to sensitize the oxide. The zinc oxide used is finely divided and of the sensitized type used in electrophotography. These are available commercially or finely divided zinc oxide can be sensitized by the addition of various sensitizing dyes as is known in the art. The amount of dye to be used corresponds to the amount presently being used for that purpose, generally about 0.05 to 0.25 percent of dye based on weight of zinc oxide.

Various commerical electrostatic machines may be used to evaluate the coatings and thereby the resin contained therein. An appropriate liquid toner suitable for this purpose is described in U.S. Pat. No. 3,399,140. By trial and error, the amount of light is adjusted to get the best print for visual inspection. Resolution of lines in the photoprint, the black density of the print, background and the general quality of the print are determined by visual inspection.

Figure 1:
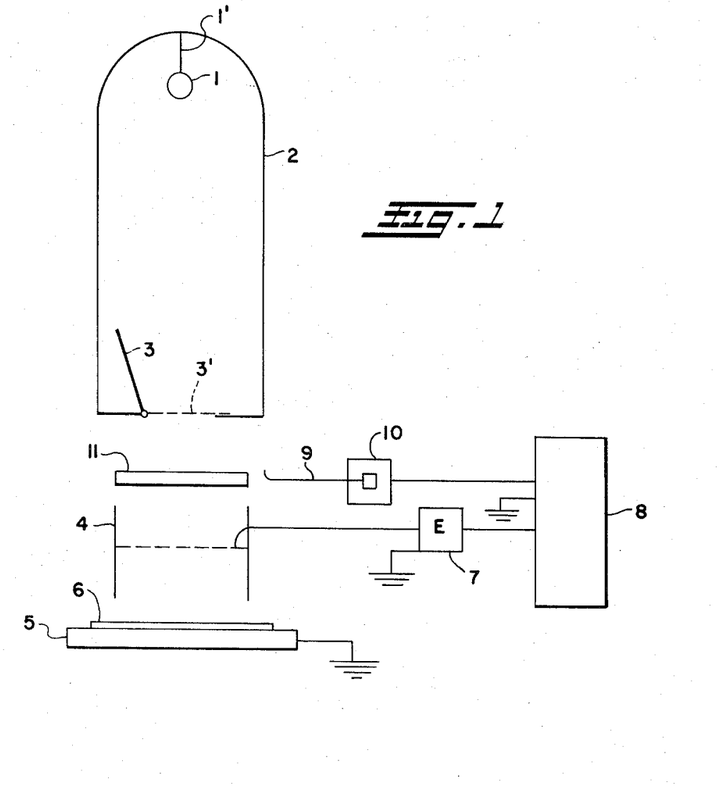
FIG. 1 shows a schematic diagram of this equipment and FIG. 2 shows a profile plotted according to recordings from this equipment.

The coatings may also be evaluated by a particular type of equipment designed for this purpose. A discharging light source is housed at the top of a light tunnel arranged vertically with a provision for a shutter at the bottom end. Vertically below this light tunnel an inductive probe is placed above a ground plate. This probe is designed to amplify the signals obtained from an electrostatic discharge and is connected to a high-gain and high-input resistance amplifier. Signals from the amplifier are recorded by a suitable oscilloscope. A fiber optic connected to a photomultiplier tube is used and the output of the photomultiplier is used to trigger the oscilloscope. A "specimen" of the oxide-resin-coated paper, presubjected to a negative corona discharge is placed between the probe and the ground plate. The equipment is encased to shut off outside light. The photodischarge profile is recorded by opening the shutter and allowing the light to strike and act on the specimen. Signals of dissipation of the charge from the specimen are then received on the screen oscilloscope and can be photographed.

The photodischarge profile can be recorded at various wavelengths by inserting between the shutter and the specimen an appropriate optical filter. In this way, in addition to recordings for visible light, various wavelengths such as 360, 480, 580 and 610 nm can be applied and their effects on discharge recorded.

The profile is usually recorded as a bell-shaped curve of various widths depending upon the coating. It may be symmetrical and may even have humps or shoulders, depending on the characteristics of the coating. The peak of the curve is described as the time required for the specimen to discharge complete for a given light intensity. If the light intensity (1) is expressed in foot candle units and the time for complete discharge ($t$) in seconds, then light exposure will be $1 \times t$ with units of foot candle-seconds. When the light intensity is expressed in microwatts/cm$^2$, the light exposure will have units of microwattsecond/cm$^2$. By obtaining profiles for visible light and for 360 nm, the analyses at 360 nm eliminates the role of the sensitizing effect of the ZnO and thus the performance of the resin is reflected.

Figure 3:
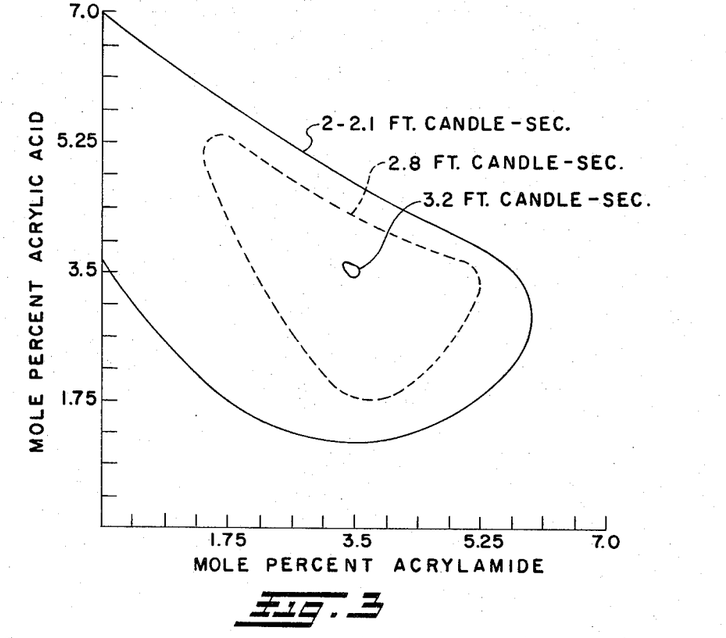

FIG. 3 represents a light exposure diagram for visible light at various intensities shown as a function of acrylic acid and acrylamide proportions in the acrylic resins. The compositions of these resins are as shown in Example II. Isoilluminant expresses equal light exposure, and two distinct isoilluminant contours are found. The first contour is with light exposure of 2.0–2.1 foot candle-seconds and is shown as the solid line in FIG. 3. The other contour is with light exposure of 2.8 foot candle-seconds and is shown as the dotted line in FIG. 3. In the middle of both contours, a small contour or "hole" is obtained with 3.2 foot candle-seconds. Compositions represented by this area are slow and give prints with a dirty background. Good speed and prints of high quality, free of background, are obtained with the compositions represented by the area between the two (the solid and dotted) contours. Best results are obtained when the acrylic composition is represented by the area midway between the two contours.

Figure 4:
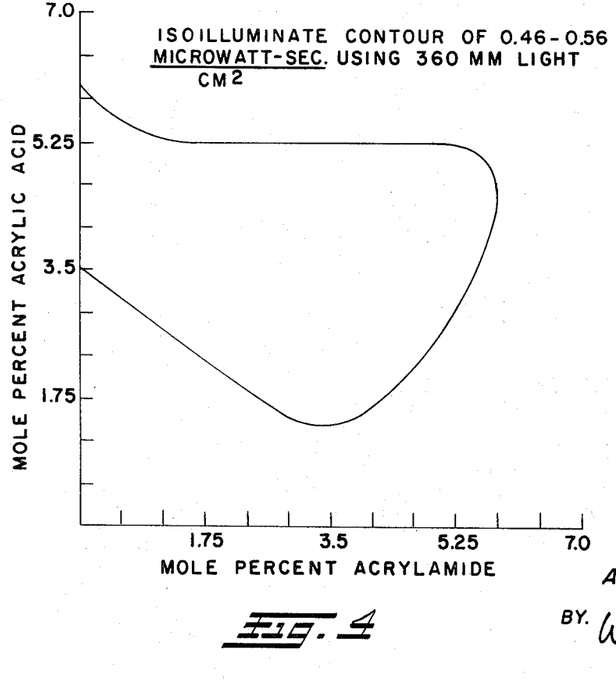

FIG. 4 represents the light exposure diagram for 360 nm light as a function of the acrylic acid and acrylamide contents of the resin. The isoilluminant is 0.46–0.56 microwatt-second/cm$^2$. Compositions inside the contour perform very well with a light wavelength of 360 nm. Similar light exposure diagrams for other wavelengths reveal the best composition or operable composition of this invention for the respective wavelengths. The visual print evaluation is in general accordance with the best compositions of acrylic acid and acrylamide contents or mole percentages represented by the contours.

In the drawings, FIG. 1 represents the apparatus described above for evaluating the oxide-resin coatings. Lamp 1 is suspended in housing 2 by means of supporting and supply means 1'. Shutter 3 is shown in the open position and is represented by 3' when in the closed position. The inductive probe 4 is positioned above ground plate 5 on which is placed the coated paper specimen 6 which is to be tested. Probe 4 is connected to a high gain, high input amplifier 7. Output of the amplifier is connected to oscilloscope 8 for the recording and display of the signal. Fiber optic 9 is connected to photomultiplier tube 10 and output of the photomultiplier tube is used to trigger the oscilloscope. When monochromatic light is to be used, filter 11 is introduced between the probe and the light housing. The oxide-resin coated paper is charged with a negative corona before it is placed on the ground plate. Amplifier 7 is turned on and shutter 3 is opened when the paper is ready for testing. The light discharge of the coating is plotted on the oscilloscope. A typical discharge graph is shown in FIG. 2, where discharge current I is plotted against $t_p$ or time in seconds.

Figure 2:
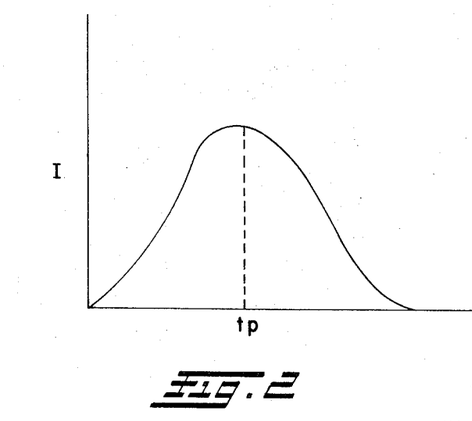

The time to reach a peak "$t_p$" as shown in the profile plotted in FIG. 2 is the time required for a given oxide-resin smaple to discharge at 0 charge level for a given light intensity. In other words, for a fixed coating, $t_p$ is a function of light intensity. If light intensity is measured in foot candles, then the total exposure required for the coating to discharge is light intensity (1) times $t_p$ in seconds. This gives exposure in foot candle-second units. If light intensity is measured in uw/cm$^2$, then exposure required to discharge the coating is measured in uw–sec./cm$^2$ or ergs/cm$^2$.

The invention is illustrated by the following examples. These are presented merely for illustrative purposes and are not intended to restrict in any way the scope of the invention nor the manner in which it may be practiced. Parts and percentages are given by weight unless otherwise specified.

EXAMPLE I

In a 5-liter reaction vessel equipped with stirrer, addition funnel, condenser and thermometer, 637 parts of toluene is charged and heated to 95° C. under an inert gas blanket, such as nitrogen. A monomer-initiator-propanol mixture is prepared consisting of 520 parts styrene, 480 parts butyl acrylate, 887 parts butyl methacrylate, 187.5 parts methyl methacrylate, 22.5 parts acrylic acid, 22.2 parts acrylamide, 10.6 parts of azobisisobutyronitrile and 425 parts of 1-propanol. This mixture is added to the hot toluene over a period of 5 hours and the temperature of the reaction mass is maintained at 95° C. ± 2° C. during the period of addition and for an additional 8 hours. Towards the end of the heating period, the reaction mass is diluted with 1063 parts of toluene. The resulting solution has a non-volatile content of 48.2% and the viscosity of the resin solution is 5.5 Stokes. This resin solution is mixed with zinc oxide pigment as described herein. Various dyes such as Fluorescein dye, Alizerin Light Green G. S., Eriochrome Black T or others known in the art as suitable for that purpose are added to sensitize the zinc oxide or titanium dioxide.

The resultant oxide resin composition is applied to paper as a coating having a thickness of 10–13 micrometers. The paper is allowed to dry rapidly in a hot blowing atmosphere and then allowed to adapt to darkness for 24 hours. When tested according to the methods described herein, the coated paper shows excellent electrophotographic properties.

EXAMPLE II

Fourteen resin compositions are prepared using the procedure of Example I with identical conditions and in each case the basic composition comprises:

Styrene — 2.0 Moles
Butyl Acrylate —1.5 Moles
Butyl Methacrylate — 2.5 Moles
Methyl Methacrylate — 0.75 Mole The amount of acrylic acid and acrylamide is varied in each case in accordance with the following table:

| Resin No. | Acrylic Acid (Moles) | Acrylamide (Moles) |
|---|---|---|
| 1 | 0.0 | 0.0 |
| 2 | 0.25 | 0.0 |
| 3 | 0.50 | 0.0 |
| 4 | 0.0 | 0.25 |
| 5 | 0.0 | 0.50 |
| 6 | 0.125 | 0.125 |
| 7 | 0.125 | 0.25 |
| 8 | 0.125 | 0.375 |
| 9 | 0.25 | 0.125 |
| 10 | 0.25 | 0.25 |
| 11 | 0.25 | 0.375 |
| 12 | 0.375 | 0.125 |
| 13 | 0.375 | 0.25 |
| 14 | 0.375 | 0.375 |

In order to achieve solubility of the acrylamide, 1-propanol is used with the monomer mix in each case. The final solvent balance is 8 parts toluene and two parts 1-propanol. The copolymerization is conducted by heating to 95° C. under an inert gas blanket (nitrogen) an initial charge of 637 parts of toluene. The monomer-initiator-propanol mixture is prepared consisting of 520 parts of styrene, 480 parts of butyl acrylate, 887 parts of butyl methacrylate, 187.5 parts methyl methacrylate, 10.6 parts of azo-bisisobutyronitrile and 25 parts of 1-propanol, and the appropriate amount of acrylic acid and acrylamide. (For example, for Resin 6, 22.5 parts of acrylic acid and 22.2 parts of acrylamide are used.) This mixutre is added to the hot toluene over a period of 5 hours with the temperature maintained at 95° C. ± 2° C. This temperature is maintained for an additional eight hours and towards the end of this period it is diluted with 1063 parts toluene. (For Resin 6, the final percent non-volatile content is 48.2 and the viscosity of the resin solution is 5.5 Stokes.)

In preparing the coating formulation, the following amounts are used:

| | Parts |
|---|---|
| Zinc Oxide (photoconductive pigment such as Photox 80 of New Jersey Zinc) | 4711.5 |
| Resin | 1516.0 |
| Toluene | 3395.0 |
| Ethanol | 79.4 |
| Methyl Cellosolve | 58.0 |
| Fluorescein Dye | 0.3 |
| Alizarin Light Green G. S. | 1.1 |
| Eriochrome Black T | 0.4 |
| Methanol | 238.3 |
| Total Weight | 10000.0 |

The zinc oxide pigment is ground in the resin solution with part of the toluene and ethanol in a sand mill. After grinding, the dispersion is adjusted for toluene according to the formula. Dye solutions in methyl cellosolve and methanol are added and mixed well to give the final coating composition. The coating is laid down on Kimberly Clark Paper 9515 with either a power driven or manual applicator. This can be a doctor blade or any other appropriate modification. A film thickness is applied to give a dry film in the range of 10–13 micrometers. After application of the wet coating, it is allowed to dry rapidly in a hot blowing atmosphere and the coated paper is then allowed to adapt to darkness for 24 hours. In testing, the coated paper is exposed to a negative corona and the charge measured with a simple electrometer with reference to a fixed plate. Papers are coated according to this procedure individually with the 14 resins prepared above in Example II. These are tested with the specially designed equipment described above, and the results are plotted to give the curves shown in FIGS. III and IV.

EXAMPLE III

The procedure of Example I is repeated using a temperature of 265° F. ± 5° F. (130° C. ± 3° C.) using the following amounts of materials:

| | Parts | Mole Ratio |
|---|---|---|
| Styrene | 510 | 2.0 |
| Butyl Methacrylate | 887 | 2.5 |
| Butyl Acrylate | 480 | 1.5 |
| Methyl Methacrylate | 187.5 | 0.75 |
| Acrylic Acid | 45 | 0.25 |
| Acrylamide | 17.7 | 0.1 |
| Azo-bisisobutyronitrile | 6.3 | |
| Xylene (For resin preparation) | 1063 | |
| Xylene (for dilution) | 1063 | |

The addition period is still 5 hours, but reaction after addition is completed is for 2 hours instead of eight hours. The resin solution viscosity of the product is 13 Stokes and the percent non-volatile is 47.8. This resin is used in a diazo coating formulation as follows:

| | Parts |
|---|---|
| Zinc Oxide (St. Joe 321PC) | 3680 |
| Resin | 2684 |
| Toluene | 3213 |
| Ethanol (95%) | 359 |
| Methanol | 61.2 |
| Eriochrome Black T | 2.6 |
| Crystal Violet | 0.2 |
| Total Weight | 10000.0 |

The oxide-resin composition is tested in a commercial electrostatic copying machine and produces excellent images.

EXAMPLE IV

Excellent image producing results are also obtained when the procedure of Example III is repeated using a reaction temperature of 100° C. ± 2° C. with the reaction continued for an additional 10 hours at that temperature after addition is completed. The resin solution has a 46.7 non-volatile content and a viscosity of 16 Stokes.

EXAMPLE V

The various compositions prepared in Example II are tested under illumination with the equipment described in FIG. 1. Since the ZnO Photox 80 has a sensitizing peak at 360 nm and the sensitizing dyes have peaks at 480 nm, 580 nm and 610 nm, filters are used individually to give the corresponding monochromatic light, in addition to testing without the filters. The following table indicates the various results together with the moles of acrylic acid and acrylamide in the respective samples.

| Moles acrylic acid | Moles acrylamide | Ft. cd.-sec. | µw.-sec./cm.² at— | | | |
|---|---|---|---|---|---|---|
| | | | 360 nm. | 480 nm. | 580 nm. | 610 nm. |
| 0 | 0 | 0.4 | .0575 | 2.4 | 1.128 | 3.057 |
| 0.25 | 0 | 2.00 | .575 | 1.68 | 4.512 | 12.84 |
| 0.50 | 0 | 2.01 | 0.690 | 1.68 | 4.512 | 11.007 |
| 0 | 0.25 | 1.08 | 0.115 | 0.48 | 2.115 | 6.115 |
| 0 | 0.50 | 3.00 | 0.23 | 2.40 | 6.768 | 24.46 |
| 0.125 | 0.125 | 2.08 | 0.345 | 1.53 | 4.512 | 15.287 |
| 0.125 | 0.25 | 2.42 | 0.46 | 1.92 | 5.499 | 18.345 |
| 0.125 | 0.375 | 2.1 | .391 | 1.44 | 4.512 | 15.899 |
| 0.25 | 0.125 | 1.786 | .46 | 1.632 | 3.807 | 11.007 |
| 0.25 | 0.25 | 3.1977 | .46 | 2.592 | 6.345 | 21.402 |
| 0.25 | 0.375 | 2.66 | .575 | 1.92 | 5.64 | 16.51 |
| 0.375 | 0.125 | 2.8 | 0.575 | 2.496 | 6.204 | 18.34 |
| 0.375 | 0.25 | 1.786 | 0.517 | 1.536 | 3.666 | 10.395 |
| 0.375 | 0.375 | 1.7133 | 0.46 | 1.632 | 3.525 | 8.56 |

When tested for black density or contrast in printing, the compositions containing both acrylamide and acrylic acid are graded at least good and in two cases excellent.

EXAMPLE VI

The procedure of Example I is repeated using vinyl acetate as the major comonomer and using the following comonomer mixtures:

|  | A | B | C | D |
|---|---|---|---|---|
| Vinyl acetate (moles) | 8.0 | 8.0 | 8.5 | 7.5 |
| Methyl methacrylate (moles) | 2.0 | 1.5 | 1.0 | 1.5 |
| Butyl methacrylate (moles) | — | 1.0 | 0.5 | 1.0 |
| Ethyl acrylate (moles) | 1.0 | 0.5 | 1.0 | 0.5 |
| Methacrylic acid (moles) | 0.5 | 0.4 | 0.35 | 0.45 |
| Acrylamide (moles) | 0.5 | 0.4 | 0.5 | 0.4 |

Each polymerization is conducted at 70° C. ± 2° C. with the monomer addition being effected over a 6 hour period and polymerization continued for an additional 19 hours. The vinyl acetate is fed separately to the system from the mixture of other monomers and at a slightly faster rate because of its slower polymerization rate. The final solutions have a non-volatile content of 38–40 percent and the solvent is 8:2 of toluene:1-propanol. When tested in the zinc oxide coating for printing characteristics each resin shows the same improvements as noted in Example I. Similar results are also obtained when the vinyl acetate is replaced with equivalent amounts respectively of vinyl propionate, isopropenyl acetate and vinyl octoate.

EXAMPLE VII

The procedure of Example I is repeated a number of times with similar improvements in printing characteristics using the following variations in monomer components:

| | Moles | | | | | |
|---|---|---|---|---|---|---|
| | A | B | C | D | E | F |
| Styrene | 4 | | 2 | 3 | | 2 |
| Vinyl toluene | | 3 | | | | |
| α-Me styrene | | | 2 | | | |
| Acrylonitrile | | | | | | 2 |
| Me methacrylate | 2 | 1 | | 2 | 3 | |
| Butyl meth-acrylate | 1 | 2 | 2 | 2 | 3 | 2 |
| Octyl meth-acrylate | 1 | | | | | |
| Me ethacrylate | | 1 | 2 | 1 | 1 | 2 |
| Acrylic acid | | 0.3 | 0.1 | 0.25 | 0.3 | 0.1 |
| Fumaric acid | 0.25 | | | | | |
| Maleic monoamide | | | 0.3 | | | 0.3 |
| Methacrylamide | 0.5 | | | 0.25 | | |
| Acrylamide | | 0.4 | 0.1 | | 0.2 | 0.1 |

EXAMPLE VIII

In a 5 liter reaction flask equipped with stirrer, addition funnel, condenser and thermometer, 1,428 g. of toluene is charged and heated to 100° C. ± 2° C. under an inert gas blanket. A monomer-initiator mixture is prepared consisting of 520.0 g. styrene, 710.0 g. butyl methacrylate, 640.0 g. butyl acrylate, 187.0 g. methyl methacrylate, 45.0 g. acrylic acid, 46.5 g. t-butyl aminoethyl methacrylate and 6.45 g. azo-bisisobutyronitrile. This mixture is added to hot toluene over a period of five hours and the temperature of the reaction mass is maintained at 100° C. ± 2° C. during the period of addition and for an additional 15 hours. Towards the end of the holding period, the reaction mass is cut with 724.0 g. toluene. The resulting resin solution has a non-volatile content of 47.6%, the viscosity of the resin solution is 63 Stokes and the acid value is 16.0 mgm KOH per g. solid resin. A zinc oxide coating formulation is prepared as above in Example II and tested electrophotographically with the following results:

| | |
|---|---|
| Light exposure required for photo-discharge using visible light | 0.40 foot candle-sec. |
| Light exposure required for photo-discharge using ultraviolet light of 380 nanometer (nm) wavelength | 0.138 microwatts seconds per cm² |

Both speed and density in printing are excellent.

EXAMPLE IX

The procedure of Example VIII is repeated using the following proportions of the components:

| | Grams | Mole Ratio | Mole % |
|---|---|---|---|
| Styrene | 520 | 2 | 28.6 |
| Butyl methacrylate | 710 | 2 | 28.6 |
| Butyl acrylate | 640 | 2 | 28.6 |
| Methyl methacrylate | 187 | 0.75 | 10.7 |
| Acrylic acid | 45 | 0.25 | 3.57 |
| Azo-bisisobutyronitrile | 0.3% based on total monomer | | |
| Toluene | 1398 grams initially and 704 grams for dilution | | |
| Reaction temperature | 100° C. | | |
| Reaction time | 4 hours for addition; 25 hours for polymerization | | |
| Viscosity (Stokes) | 22 | | |
| % Nonvolatile material | 47.5 | | |
| Acid Value | 16.4 | | |
| Light exposure required for photo-discharge using visible light | 0.96 foot candle-sec. | | |
| Light exposure required for photo-discharge using ultraviolet light of 380 nanometer (nm) wavelength | 0.23 micrwatts-sec. per cm² | | |

Speed unsatisfactory apparently due to absence of amine.

EXAMPLE X

The procedure of Example VIII is repeated using the following proportions of the components:

| | Grams | Mole Ratio | Mole % |
|---|---|---|---|
| Styrene | 520 | 2.0 | 28.2 |
| Butyl methacrylate | 710 | 2.0 | 28.2 |
| Butyl acrylate | 640 | 2.0 | 28.2 |
| Methyl methacrylate | 187 | 0.75 | 10.6 |
| Acrylic acid | 45 | 0.25 | 3.52 |
| Dimethylaminoethyl methacrylate | 39.3 | 0.10 | 1.41 |
| Azo-bisisobutyronitrile | 0.3% based on total monomer. | | |
| Toluene | 1072 g. initially and 1072 g. for dilution | | |
| Reaction temperature | 100° C. | | |
| Reaction time | 5 hrs. for addition; 16 hrs. for polymerization | | |
| Viscosity (Stokes) | 22 | | |
| % Nonvolatile material | 48.5 | | |
| Acid value | 14.7 | | |
| Light exposure required for photo-discharge using visible light | 0.80 foot candle-sec. | | |
| Light exposure required for photo-discharge using ultraviolet light of 380 nanometer (nm) | (1) 0.184 microwatts-sec. per cm² (2) 0.136 microwatts-sec. per cm² | | |

Both the speed and density in printing are excellent.

EXAMPLE XI

The procedure of Example VIII is repeated using the following proportions of the components:

| | Grams | Mole Ratio | Mole % |
|---|---|---|---|
| Styrene | 520 | 2.0 | 27.8 |
| Butyl methacrylate | 710 | 2.0 | 27.8 |
| Butyl acrylate | 640 | 2.0 | 27.8 |
| Methyl methacrylate | 187 | 0.75 | 10.4 |
| Acrylic acid | 45 | 0.25 | 3.47 |
| Dimethylaminoethyl methacrylate | 78.5 | 0.20 | 2.78 |
| Azo-bisisobutyronitrile | 0.3% based on total monomer | | |
| Toluene | 1457 g. initially and 726 g. for dilution | | |
| Reaction temperature | 100° C. | | |
| Reaction time | 5 hrs. for addition; 25 hrs. for polymerization | | |
| Viscosity (Stokes) | 27 | | |
| % Monvolatile Material | 49.4 | | |
| Acid value | 16.2 | | |
| Light exposure required for photodischarge using visible light | 0.48 foot candle-sec. | | |
| Light exposure required for photodischarge using ultraviolet light of 380 nanometer (nm) wavelength | 0.101 microwatts-sec./cm² | | |

Both speed and density in printing are excellent.

EXAMPLE XII

The procedure of Example VIII is repeated using the following proportions of the components:

| | Grams | Mole Ratio | Mole % |
|---|---|---|---|
| Styrene | 520 | 2.0 | 27.0 |
| butyl methacrylate | 710 | 2.0 | 27.0 |
| Butyl acrylate | 640 | 2.0 | 27.0 |
| Methyl methacrylate | 187 | 0.75 | 10.1 |
| Acrylic acid | 45 | 0.25 | 3.38 |
| Dimethylaminoethyl methacrylate | 157 | 0.40 | 5.41 |
| Azo-bisisobutyronitrile | 0.3% based on total monomer | | |
| Toluene | 1504 g. initially and 758 g. for dilution | | |
| Reaction temperature | 100° C. | | |
| Reaction time | 5 hrs. for addition; 17 hrs. for polymerization | | |
| Viscosity (Stokes) | 15 | | |
| % Nonvolatile meterial | 49.9 | | |
| Acid value | 15.2 | | |
| Light exposure required for photo-discharge using visible light | 0.56 foot candle-sec. | | |
| Light exposure required for photo-discharge using ultraviolet light of 380 nanometer (nm) wavelength | 0.101 microwatts-sec./cm² | | |

The speed and density in printing are excellent.

EXAMPLE XIII

The procedure of Example VIII is repeated using the following proportions of the components:

| | Grams | Mole Ratio | Mole % |
|---|---|---|---|
| Styrene | 2890 | 2.0 | 28.2 |
| Butyl methacrylate | 4932 | 2.5 | 35.2 |
| Butyl acrylate | 2668 | 1.5 | 21.1 |
| Methyl methacrylate | 1042 | 0.75 | 10.7 |
| Acrylic acid | 250 | 0.25 | 3.52 |
| Dimethylaminoethyl methacrylate | 218 | 0.10 | 1.41 |
| Azo-bisisobutyronitrile | 0.5% based on total monomer | | |
| Toluene | 12,030 g. initially | | |
| Reaction temperature | 100° C. | | |
| Reaction time | 5 hrs. for addition; 5 hrs. for polymerization | | |
| Viscosity (Stokes) | 13 | | |
| % Nonvolatile material | 48.8 | | |
| Light exposure required for photo-discharge using visible light | 0.96 foot candle-sec. | | |
| Light exposure required for photo-discharge using ultraviolet light of 380 nanometer (nm) wavelength | 0.32 microwatts-sec./cm² | | |

Both the speed and density in printing are excellent.

EXAMPLE XIV

The procedure of Example VIII is repeated using the following proportions of the components:

| | Grams | Mole Ratio | Mole % |
|---|---|---|---|
| Styrene | 510 | 2.0 | 28.6 |
| Butyl methacrylate | 887 | 2.5 | 35.7 |
| Butyl acrylate | 480 | 1.5 | 28.6 |
| Methyl methacrylate | 187 | 0.75 | 10.7 |
| Acrylic Acid | 45 | 0.25 | 3.57 |
| Azo-bisisobutyronitrile | 0.3% based on total monomer | | |
| Xylene | 1050 g. initially; 1050 g. for dilution | | |
| Reaction temperature | 130° C. | | |
| Reaction time | 5 hrs. for addition; 6 hrs. for polymerization | | |
| Viscosity (Stokes) | 6.3 | | |
| % Nonvolatile material | 46.3 | | |
| Acid value | 17.4 | | |
| Light exposure required for photo-discharge using ultraviolet light of 380 nanometer (nm) wavelength | 0.40 microwatts-sec./cm² | | |
| Light exposure required for photo-discharge using visible light | 1.20 foot candle-sec. | | |

Speed in printing is unsatisfactory apparently due to absence of amine.

EXAMPLE XV

The procedure of Example VIII is repeated using the following proportions of components:

| | Grams | Mole Ratio | Mole % |
|---|---|---|---|
| Styrene | 520 | 2.0 | 27.6 |
| Butyl Methacrylate | 710 | 2.0 | 27.6 |
| Butyl acrylate | 640 | 2.0 | 27.6 |
| Methyl methacrylate | 250 | 1.0 | 13.8 |
| Acrylic acid | -0- | -0- | -0- |
| Dimethylaminoethyl methacrylate | 98 | 0.25 | 3.45 |
| Azo-bisisobutyronitrile | 0.5% by weight based on total monomer | | |
| Xylene | 1115 g. initially and 1115 g. for dilution | | |
| Reaction temperature | 130° C. | | |
| Reaction time | 4 hrs. for addition; 7 hrs. for polymerization | | |
| Viscosity (Stokes) | 2 | | |
| % Nonvolatile material | 48.2 | | |
| Light exposure required for photo-discharge using visible light | 1.12 foot candle-sec. | | |
| Light exposure required for photo-discharge using ultraviolet light of 380 nanometer (nm) wavelength | 0.23 microwatts-sec./cm² | | |

Speed unsatisfactory apparently due to absence of acrylic acid.

EXAMPLE XVI

The procedure of Example VIII is repeated using the following proportions of the components:

| | Grams | Mole Ratio | Mole % |
|---|---|---|---|
| Styrene | 416 | 2.0 | 25.8 |
| Butyl methacrylate | 568 | 2.0 | 25.8 |
| Butyl acrylate | 512 | 2.0 | 25.8 |
| Methyl methacrylate | 300 | 1.5 | 19.4 |
| Acrylic acid | -0- | -0- | -0- |
| Dimethylaminoethyl methacrylate | 78.5 | 0.25 | 3.23 |
| Hydrochloric acid (36% Conc. in 100 g. propanol) | 5 | 0.025 equiv. | |
| Azobisisobutyronitrile | 0.5% based on total monomer | | |

| | |
|---|---|
| Xylene | 940 g. initially; 564 & 279 g. propanol for dilution |
| Reaction temperature | 130° C. |
| Reaction time | 4 hrs. for addition; 8 hrs. for polymerization |
| Viscosity (Stokes) | 2 |
| % Nonvolatile material | 50 |
| Light exposure required for photo-discharge using visible light | 1.2 foot candle-sec. |
| Light exposure required for photo-discharge using ultraviolet light of 380 nanometer (nm) wavelength | 0.235 microwatts-sec./cm² |

Speed unsatisfactory due to absence of acrylic acid.

EXAMPLE XVII

The procedure of Example VIII is repeated using the following proportions of the components:

| | Grams | Mole Ratio | Mole % |
|---|---|---|---|
| Styrene | 416 | 2.0 | 25.8 |
| Butyl methacrylate | 568 | 2.0 | 25.8 |
| Butyl acrylate | 512 | 2.0 | 25.8 |
| Methyl methacrylate | 300 | 1.5 | 19.4 |
| Acrylic acid | -0- | -0- | -0- |
| t-Butylaminoethyl methacrylate | 93 | 0.25 | 3.23 |
| Azobisisobutyronitrile | 0.5% based on total monomer | | |
| Hydrochloric acid (36% in 100 g. propanol) | 5 | 0.025 equiv. | |
| Xylene | 947 g. initially; 568 g. & 279 g. propanol for dilution | | |
| Reaction temperature | 130° C. | | |
| Reaction time | 4 hrs. initially; 10 hrs. for polymerization | | |
| Viscosity (Stokes) | 2.5 | | |
| % Nonvolatile material | 48.9 | | |
| Light exposure required for photo-discharge using visible light | 1.04 foot candle-sec. | | |
| Light exposure required for photo-discharge using ultraviolet light of 380 nanometer (nm) wavelength | 0.299 microwatts-sec./cm² | | |

Speed unsatisfactory apparently due to absence of acrylic acid.

EXAMPLE XVIII

The procedure of Example VIII is repeated using the following proportions of the components:

| | Grams | Mole Ratio | Mole % |
|---|---|---|---|
| Styrene | 520 | 2.0 | 29.5 |
| Butyl methacrylate | 1065 | 3.0 | 44.2 |
| Stearyl methacrylate | 352.5 | 0.42 | 6.19 |
| Methyl methacrylate | 250 | 1.0 | 14.7 |
| Acrylic acid | 45 | 0.25 | 3.69 |
| t-Butylaminoethyl methacrylate | 46.5 | 0.10 | 1.48 |
| Azobisisobutyronitrile | 0.2% by wt. based on total wt. of monomer | | |
| Toluene | 1520 g. initially; 760 g. for dilution | | |
| Reaction temperature | 100° C. | | |
| Reaction time | 5 hrs. for addition; 10 hrs. for polymerization | | |
| Viscosity (Stokes) | 32 | | |
| % Nonvolatile material | 48.9 | | |
| Acid value | 15.4 | | |
| Light exposure required for photo-discharge using ultraviolet light of 380 nanometer (nm) wavelength | 0.020 microwatts-sec./cm² | | |

Speed and density in printing are excellent.

EXAMPLE XIX

The procedure of Example VIII is repeated using the following proportions of the components:

| | Grams | Mole Ratio | Mole % |
|---|---|---|---|
| Styrene | 624 | 2.0 | 29.9 |
| Butyl methacrylate | 1278 | 3.0 | 44.9 |
| Stearyl methacrylate | 423 | 0.42 | 6.29 |
| Methyl methacrylate | 300 | 1.0 | 15.0 |
| Acrylic acid | 54 | 0.25 | 3.74 |
| Azobisisobutyronitrile | 0.2% based on total monomer | | |
| Toluene | 1340 g. initially; 1340 g. for dilution | | |
| Reaction temperature | 100° C. | | |
| Reaction time | 5 hrs. for addition; 14 hrs. for polymerization | | |
| Viscosity (Stokes) | 40 | | |
| % Nonvolatile material | 47.5 | | |
| Acid value | 12.3 | | |
| Light exposure required for photo-discharge using ultraviolet light of 380 nanometer (nm) wavelength | 0.825 microwatts-sec./ch² | | |

Speed unsatisfactory apparently due to absence of amine.

EXAMPLE XX

The procedure of Example VIII is repeated using the following proportions of the components:

| | Grams | Mole Ratio | Mole % |
|---|---|---|---|
| Styrene | 520 | 2.0 | 27.6 |
| Butyl methacrylate | 710 | 2.0 | 27.6 |
| Butyl acrylate | 640 | 2.0 | 27.6 |
| Methyl methacrylate | 250 | 1.0 | 13.8 |
| Acrylic acid | -0- | -0- | -0- |
| t-Butylaminoethyl methacrylate | 116 | 0.25 | 3.45 |
| Azobisisobutyronitrile | 0.5% based on total monomer | | |
| Xylene | 1120 g. initially; 1120 g. for dilution | | |
| Reaction temperature | 130° C. | | |
| Reaction time | 4 hrs. for addition; 7 hrs. for polymerization | | |
| Viscosity (Stokes) | 2.5 | | |
| % Nonvolatile material | 49.6 | | |
| Light exposure required for photo-discharge using visible light | 0.64 foot candle-sec. | | |
| Light exposure required for photo-discharge using ultraviolet light of 380 nanometer (nm) wavelength | 0.184 microwatts-sec./cm² | | |

Unsatisfactory density in printing apparently due to absence of acid.

EXAMPLE XXI

The procedure of Example VIII is repeated using the following proportions of components:

| | Grams | Mole Ratio | Mole % |
|---|---|---|---|
| Styrene | 364 | 2.0 | 27.8 |
| Butyl methacrylate | 497 | 2.0 | 27.8 |
| Butyl acrylate | 448 | 2.0 | 27.8 |
| Methyl methacrylate | 130 | 0.75 | 10.4 |
| Acrylic acid | 31 | 0.25 | 3.4 |
| 2-Aminoethyl vinyl ether | 60 | 0.20 | 2.8 |
| Azobisisobutyronitrile | 0.3% based on total monomer | | |
| Xylene | 1000 g. initially; 470 g. for dilution | | |
| Reaction temperature | 100° C. | | |
| Reaction time | 5 hrs. for addition; 10 hrs. for polymerization | | |
| % Nonvolatile material | 49.8 | | |

Gives excellent speed and density.

EXAMPLE XXII

The procedure of Example VIII is repeated using the following proportions of components:

| | Grams | Mole Ratio | Mole % |
|---|---|---|---|
| Butyl Methacrylate | 491 | 2.0 | 27 |
| Butyl acrylate | 443 | 2.0 | 27 |
| Methyl methacrylate | 475 | 2.75 | 37 |
| Methacrylic acid | 36 | 0.25 | 3.5 |
| 2-Aminoethyl vinyl ether | 120 | 0.40 | 5.5 |
| Azobisisobutyronitrile | 0.3% based on total monomer | | |
| Xylene | 1000 g. for addition; 440 g. for polymerization | | |
| Reaction temperature | 100° C. | | |

Reaction time
5 hrs. for addition; 10 hrs. for polymerization
% Nonvolatile material
51.1

Gives excellent speed and density.

EXAMPLE XXIII

The procedure of Example VIII is repeated using the following proportions of the components:

| | Grams | Mole ratio | Mole % |
|---|---|---|---|
| Styrene | 510 | 2.0 | 26.8 |
| Butyl methacrylate | 887 | 2.5 | 33.6 |
| Butyl acrylate | 480 | 1.5 | 20.1 |
| Methyl methacrylate | 187 | 0.75 | 10.1 |
| Acrylic acid | 3.6 | 0.5 | 6.71 |
| Vinyl pyridine | 21 | 0.20 | 2.68 |
| Azobisisobutyronitrile | 0.3% based on total monomer content | | |
| Toluene | 1044 g. initially; 1045 g. for dilution | | |
| Reaction temperature | 100° C. | | |
| Reaction time | 3.5 hrs. for addition; 18 hrs. for polymerization | | |
| Viscosity (Stokes) | 10 | | |
| % Nonvolatile material | 47.5 | | |
| Acid value | 18.0 | | |
| light exposure required for photo-discharge using visible light | 0.80 foot candle-sec. | | |
| Light exposure required for photo-discharge using ultraviolet light of 380 nanometer (nm) wavelength | 0.184 microwatts-sec./cm² | | |

Speed and density of printing are excellent.

EXAMPLE XXIV

Two solutions are made from the following monomers:

| Solution No. 1 | Vinyl acetate | 548.2 g. |
|---|---|---|
| | Methyl acrylate | 13.0 g. |
| | t-Butylaminoethyl methacrylate | 11.2 g. |
| | VAZO* | 2.3 g. |
| | BZ₂O₂ | 2.3 g. |
| | Toluene | 671.0 g. |
| Solution No. 2 | Vinyl acetate | 548.3 g. |
| | Methyl acrylate | 116.0 g. |
| | t-Butylaminoethyl methacrylate | 100.4 g. |
| | VAZO | 3.0 g. |
| | BZ₂O₂ | 3.0 g. |

* Azobisisobutyronitrile

Solution No. 1 is charged into a 5 liter flask fitted with heating mantle, cold water condenser and nitrogen blanket. This solution is heated to 158° F., at which time Solution No. 2 is added through a separatory funnel over a 5 hour period with the temperature maintained at 158° F.

After the addition of Solution No. 2 is completed the reaction is continued at the same temperature until an NVM of 66.6% is obtained. Then the resin is cut to 50% solids with 671.0 of toluene.
Final characteristics:
Viscosity — 5.5 Stokes
NVM — 45.7%
Acid Value — 4.1
Wt./Gallon — 8.2 lbs.
Color — <1

Upon testing in a ZnO coating as in Example II it is found that the light exposure required for photodischarge using ultraviolet light of 380 nanometers wavelength is: 0.080 microwatts-sec. per cm².

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. An electrophotographic printing receptor comprising a base and a coating on said base comprising a major proportion of photosensitized, finely divided zinc oxide and a minor proportion in relation to said zinc oxide of a resin binder consisting essentially of a copolymer of:
    a. 10 – 96 mole percent of an acrylate having the formula $CH_2=C(R)COOR'$, wherein R is H, $CH_3$ or $C_2H_3$ and R' is an alkyl radical of the formula $C_nH_{2n+1}$ with $n$ equal to 1-20;
    b. 0 – 86 mole percent of a vinyl monomer having the formula $CH_2=C(R''')R''''$, wherein R''' is H or $CH_3$ and R'''' is an aryl radical of 6 – 12 carbon atoms, -CN or -OOCR''''' wherein R''''' is an alkyl, cycloalkyl or aryl radical of one – 12 carbon atoms;
    c. 1 – 5 mole percent of a carboxylic acid monomer; and
    d. 1 – 10 mole percent of a terminally ethylenically unsaturated polymerizable amine.

2. The electrophotographic printing receptor of claim 1 in which there is 50–70 percent of said acrylate, 30–45 percent of said vinyl monomer, 1.5–3 percent of said carboxylic acid-containing monomer and 1.4–6 percent of said polymerizable amine.

3. The receptor of claim 2 in which said vinyl monomer is vinyl acetate.

4. The receptor of claim 2 in which said vinyl monomer is styrene.

5. The receptor of claim 4 in which said carboxyic acid-containing monomer is selected from the class consisting of acrylic acid and methacrylic acid.

6. The printing receptor of claim 5 in which said sensitized zinc oxide is used in a proportion of 1.3–3 parts by weight per part by weight of said resin.

7. The printing receptor of claim 1 in which said polymerizable amine is t-butylaminoethyl methacrylate.

8. The printing receptor of claim 7 in which said carboxylic acid monomer is selected from the class consisting of acrylic acid and methacrylic acid.

9. The printing receptor of claim 8 in which said polymerizable amine represents about 2 percent of weight of said resin binder.

10. The printing receptor of claim 1 in which said polymerizable amine is dimethylaminoethyl methacrylate.

11. The printing receptor of claim 10 in which said carboxylic acid monomer is selected from the class consisting of acrylic acid and methacrylic acid.

12. The printing receptor of claim 11 in which said polymerizable amine represents about 2 percent by weight of said resin binder.

13. The printing receptor of claim 1 in which said polymerizable amine is vinyl pyridine.

14. The printing receptor of claim 13 in which said carboxylic acid monomer is selected from the class consisting of acrylic acid and methacrylic acid.

15. The printing receptor of claim 14 in which said vinyl pyridine represents about 1 percent by weight of said resin binder.

16. The printing receptor of claim 1 in which said polymerizable amine is 2-aminoethyl vinyl ether.

17. The printing receptor of claim 16 in which said carboxylic acid monomer is selected from the class consisting of acrylic acid and methacrylic acid.

18. The printing receptor of claim 1 in which the mole proportions of said carboxylic acid-containing monomer and of said polymerizable amine have values coming within the area defined by and between the isoilluminant contours shown in FIG. 3 for 2–2.2 foot candle-seconds and 2.8 foot candle-seconds.

19. The printing receptor of claim 18 in which said carboxylic acid-containing monomer is acrylic acid and said polymerizable amine is t-butylaminoethyl methacrylate.

20. The printing receptor of claim 18 in which said carboxylic acid-containing monomer is selected from the class consisting of acrylic acid and methacrylic acid.

21. The printing receptor of claim 18 in which said polymerizable amine is dimethylaminoethyl methacrylate.

22. The printing receptor of claim 1 in which said base is paper.

23. The printing receptor of claim 1 in which said zinc oxide is sensitized by a dye selected from the class consisting of Eriochrome Black T, Bromophenol-B, Fluoresceine, Brilliant Yellow 6G and Alphazurine-2G.

24. The printing receptor of claim 1 in which said vinyl monomer is a vinyl aryl compound.

25. The printing receptor of claim 1 in which said vinyl monomer is styrene.

26. The printing receptor of claim 25 in which there is 30–45 mole percent of styrene.

* * * * *

UNITED STATES PATENT OFFICE
CERTIFICATE OF CORRECTION

Patent No. 3,776,724          Dated December 4, 1973

Inventor(s) Athar M. Usmani

It is certified that error appears in the above-identified patent and that said Letters Patent are hereby corrected as shown below:

Column 1, line 61, correct $CH_2=CIR)COOR'$ to read -- $CH_2=C(R)COOR'$ --

Column 2, line 2, correct R'''''' to read -- R''''' --.

Column 16, line 36, correct "carboxyic" to read -- carboxylic --.

Column 16, line 49, correct "of" to read -- by --.

Signed and sealed this 25th day of June 1974.

(SEAL)
Attest:

EDWARD M. FLETCHER, JR.
Attesting Officer

C. MARSHALL DANN
Commissioner of Patents